US012344816B2

(12) United States Patent
Lee et al.

(10) Patent No.: US 12,344,816 B2
(45) Date of Patent: Jul. 1, 2025

(54) CANDLE WICK BOUNCE-BACK

(71) Applicant: Premier Candle Corporation, Mississauga (CA)

(72) Inventors: Joanne Lee, Mississauga (CA); Burjis K. Mehta, Mississauga (CA)

(73) Assignee: Premier Candle Corporation, Mississauga (CA)

( * ) Notice: Subject to any disclaimer, the term of this patent is extended or adjusted under 35 U.S.C. 154(b) by 0 days.

(21) Appl. No.: 18/591,899

(22) Filed: Feb. 29, 2024

(65) Prior Publication Data

US 2025/0002809 A1 Jan. 2, 2025

Related U.S. Application Data

(60) Provisional application No. 63/523,501, filed on Jun. 27, 2023.

(51) Int. Cl.
*C11C 5/02* (2006.01)
*C11C 5/00* (2006.01)

(52) U.S. Cl.
CPC ................ *C11C 5/006* (2013.01); *C11C 5/02* (2013.01)

(58) Field of Classification Search
CPC .................................. C11C 5/006; C11C 5/02
See application file for complete search history.

(56) References Cited

U.S. PATENT DOCUMENTS

| | | | | |
|---|---|---|---|---|
| 2006/0075679 A1* | 4/2006 | Cap | C11C 5/006 | 44/275 |
| 2011/0217663 A1* | 9/2011 | Lu | C11C 5/006 | 264/237 |
| 2018/0355279 A1* | 12/2018 | Staley | F23D 3/16 | |

FOREIGN PATENT DOCUMENTS

| | | |
|---|---|---|
| BR | 102018072456 | 5/2020 |
| DE | 2415652 | 10/1975 |
| KR | 20140098989 | 8/2014 |
| WO | WO9909120 | 2/1999 |

* cited by examiner

*Primary Examiner* — Cephia D Toomer
(74) *Attorney, Agent, or Firm* — McHale & Slavin, P.A.

(57) ABSTRACT

The present invention is a candle wick treated, either by being coated with or incorporating, a chemical formulation. Such treated candle wick has properties causing the wick to be stiffened sufficiently that the candle wick is operable to be positioned in a straight (or virtually straight) position within a candle mold for a candle making process, as well as when surrounded by the candle body and during use of the candle (e.g., burning of the candle), and also has flexibility characteristics whereby the wick will return (bounce-back) to its straight or virtually straight position after force is exerted thereupon. No tension need to be exerted upon the wick or any tools used to exert tension to hold it straight in the mold, unlocking one of the foremost bottle-necks in high-speed filling, by taking wick fixing/straightening out of by equation.

6 Claims, 4 Drawing Sheets

CANDLE WICK BOUNCE-BACK

PRIORITY CLAIM

In accordance with 37 C.F.R. 1.76, a claim of priority is included in an Application Data Sheet filed concurrently herewith. Accordingly, this application claims priority to U.S. Provisional Patent Application 63/523,501 entitled: CANDLE WICK, filed Jun. 27, 2023; the contents of which are incorporated herein by reference.

FIELD OF THE INVENTION

This present invention relates generally to candle wicks and their composition. More specifically, the present invention relates to a novel candle wick imbued with a chemical formula enabling it to exhibit a bounce-back characteristic, ensuring the wick straightens back to its vertical position without compromising traditional burn characteristics.

BACKGROUND OF THE INVENTION

Candles, with their flickering flames and ambient glow, have been source of illumination and ambiance for centuries. The design and composition of candle wicks play a crucial role in optimizing the burn characteristics, whether using a single wick or multiple wicks, to control the burn rate and concentration of emitted light. Maintaining a straight position of the wick within the candle is of paramount importance, affecting not only the aesthetic quality of the candle but also its functional aspects.

Traditionally, candle wicks are held in place within the candle during the manufacturing process, requiring tension to be exerted to keep them straight. This is achieved through specialized tools or manual labor, posing significant challenges and drawbacks. The time-consuming nature of this process and the potential to hinder production efficiency are evident, leading to increased costs associated with tooling or labor. Moreover, the tension applied during manufacturing can lead to the stretching of the wick, compromising its diameter and, consequently, impacting burn characteristics.

The manufacturing process of candle wicks, particularly the reliance on personnel or tools to maintain straightness, introduces complexities and inefficiencies. The need for constant attention and tension during the pouring and hardening of wax adds substantial time and cost to candle production. The stretching of wicks during this process not only affects burn characteristics but also jeopardizes the overall quality of the candle. Therefore, there is a pressing need for an innovative solution that addresses these challenges and revolutionizes the candle manufacturing process by eliminating the need for wick fixing and/or straightening.

What is needed is a candle wick that incorporates a chemical formulation, either through coating or direct incorporation into the wick, imparting certain characteristics to the candle wick such as stiffness and flexibility i.e. its unique bounce-back ability, ensuring it returns to its straight or virtually straight position when subjected to external forces. The goal is to eliminate the need for tension during the candle-making process, maintaining a constant wick diameter and straightness without compromising stability or consistency. The present invention tackles these issues by providing a candle wick with the desired characteristics, efficiency, and quality in candle production.

SUMMARY OF THE INVENTION

In particular, the present disclosure relates to a candle comprising: one or more candle wicks treated with a chemical formulation whereby each candle wick has bounce-back characteristics; and candle body materials surrounding the treated candle wick; wherein the one or more candle wicks are positioned vertically through the candle parallel, or virtually parallel, to the candle's vertical longitudinal rise.

In another aspect, the present disclosure relates to a process of treating a candle wick comprising combining a candle wick with a chemical formulation whereby the candle wick has bounce-back characteristics. Such process further comprising treating the candle wick with a chemical formulation incorporating one or a combination of the following compounds: starch, modified starch, carboxymethyl starch, xanthan gum, carboxymethyl cellulose, acrylics, polyacrylic acid, magnesium salt and water-soluble polyester. Such process still further comprises treating the candle wick by one of the following: coating the candle wick with the chemical formulation; or imbuing the candle wick with the chemical formulation.

In yet another aspect, the present disclosure relates to a method of making a candle comprising: positioning one or more candle wicks treated with a chemical formulation whereby each candle wick has bounce-back characteristics, into a candle mold to be parallel or virtually parallel to the mold's vertical center; and adding candle body materials to the mold whereby said candle body materials surround the one or more candle wicks and the candle body materials harden.

The candle wick of the present invention overcomes the disadvantages in the prior art that it provides a candle wick which maintains its shape (including size of capillaries and diameter), and remains in a straight position, during the candle making process, without any need for external tension being applied, manually or otherwise, for wick-fixing. By coating or otherwise imbuing a candle wick with a chemical formulation that stiffens the wick to a level that is sufficient for the wick to be straight or virtually straight in a mold (as described herein), while maintaining a flexibility and bounce-back (spring-like) quality whereby the candle wick will return to an original straight or virtually straight position when affected by external stimulus during the candle making process. The candle wick of the present invention further can achieve consistent characteristics within the candle during use thereof (i.e., burning of the candle) including burn rate, flame height and melt pool. The candle wick of the present invention can further achieve a higher efficiency and cost-savings (i.e., tools and labor cost savings) for the candle making process.

An objective of the invention is to teach the use of a candle wick having memory and bounce back characteristics using a chemical formulation with a specific composition.

Still another objective of the invention is to provide a wick with a predetermined optimal range of wick tension.

Another objective of the invention is to eliminate the need for wick waxing or use of pre waxed wicks.

Yet still another objective of the invention is to coat wicks with a chemical formulation that can improve candle burn characteristics.

An advantage of the bounce back characteristics is the improvement of manufacturing to allow high speed candle filling (since the wick fixing process is regarded to be a bottleneck on the candle production lines), improving throughput, and lowering labor costs including eliminating the labor required for wick-fixing/wick-straightening.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

The present invention is illustrated and described herein with reference to the various drawings, in which like reference numbers are used to denote like system components/method steps, as appropriate, and in which.

DETAILED DESCRIPTION OF THE INVENTION

Figure 1:
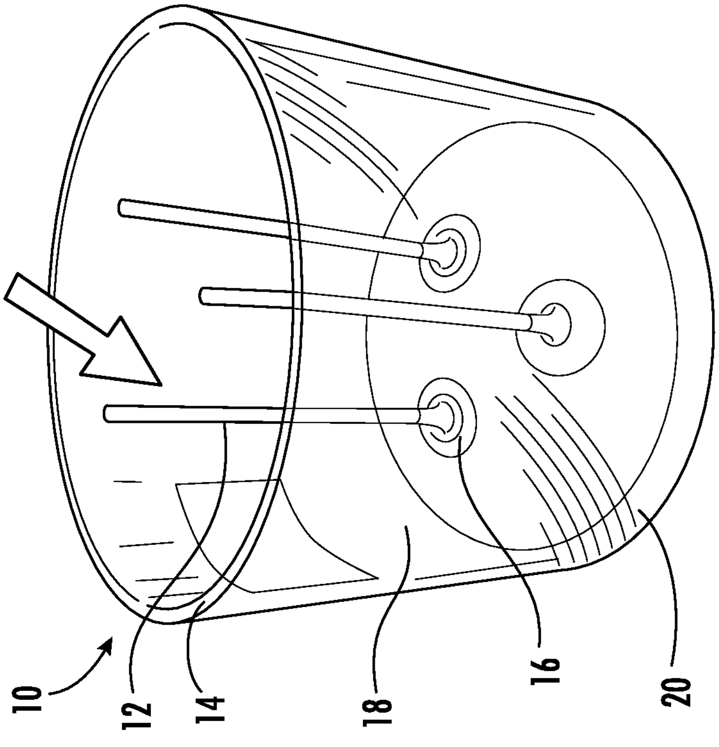
FIG. 1 is a perspective view of candle wicks of the present invention positioned within a mold during the candle making process in accordance with an embodiment of the present invention.

While the present invention is susceptible of embodiment in various forms, there is shown in the drawings and will hereafter be described a presently preferred, albeit not limiting, embodiment with the understanding that the present disclosure is to be considered an exemplification of the present invention and is not intended to limit the invention to the specific embodiments illustrated.

A conventional combustible candle body is typically comprised of any of the following, or a blend thereof: petroleum (paraffin) wax, mineral (montan) wax, synthetic wax (polyethylene or Fischer Tropsch) or natural waxes (vegetable or animal). Various additives may be utilized in the candle body composition to modify the candle characteristics, such as candle hardness, color, burn rate and aroma. For example, stearyl alcohol, stearic acid, UV inhibitors, antioxidant, polyethylene, scent oils and color pigments are known in the art as being utilized to effect particular characteristics of a candle.

Upon lighting a candle wick, the heat generated by the burning wick melts the body of the candle (i.e., the wax). The melted portions of the candle body then travel up the wick by capillary action and are vaporized. The combination of the candle body and wick composition creates specific performance characteristics of the candle. Burn rate and flame height of the candle when it is in use (i.e., burning) is further influenced by the capillary flow rate, capillary flow volume and/or functional surface area of the wick. Capillary flow rate or the rate of fuel delivery is controlled by the size of capillaries available in a given wick, namely the distance between materials that are creating capillaries. The material that creates capillaries is the individual fibers or filaments within a wick. The distance between, or force applied to, these fibers or filaments determines the size of the capillaries. Therefore, the size of the capillaries is primarily dependent upon the stitch/pick tightness or density of the wick. It is known in the trade that increasing wick density or stitch tightness will reduce the flame height or burn rate. This is due to the fact that tight stitches reduce the size of the capillaries, thereby restricting or reducing the capillary flow rate. Conversely, reducing the wick density or stitch tightness will increase the flame height or burn rate by increasing the size of the capillaries thereby increasing the capillary flow rate.

Tension applied to a wick when the wick is extended into a mold affects the size of the capillaries in a wick, as increased tension decreases the distance between materials creating capillaries, and lessened tension increases such distance. Therefore, in prior art candle making processes, the need to apply significant tension to hold a wick in a straightened position within the mold, and thereby cause the wick to extend in a straight and uniform manner within the candle body when the candle body composition surrounds the wick, can affect the size of capillaries in a wick, and thereby affect the burn rate and flame height of such candle. As the tension required to hold a wick straight within a mold can fluctuate due to a number of factors, the result is that the burn rate and flame height of candles that require tension to be applied to hold a wick straight within a mold during the candle making process can be indeterminate and variable.

Tension exerted upon a wick in prior art candle making methods further affects the functional surface area of the wick. Functional surface area is the amount of the surface area exposed to temperatures which are sufficiently high to cause vaporization. Wick size (diameter or width) as well as surface contour, will influence the functional surface area of the wick. For example, increasing the wick width or diameter will increase not only the capillary flow volume but also the functional surface area and thus increase the flame height or burn rate. Exerting tension upon a wick when it is inserted into a mold in the candle making process can alter the diameter of the wick. When tension upon the wick is increased, and the wick is thereby caused to experience increased stretch, the diameter of the wick decreases. Whereas, when tension of the wick is decreased, and the wick is thereby caused to experience decreased stretch, the diameter of the wick increases.

The present invention is a candle wick that is treated, either by being coated with or incorporating, a chemical formulation, whereby the wick is stiffened to a level (as described herein) while having a flexibility and a bounce-back characteristic (as described herein). Such treated candle wick has properties that cause the candle wick to be stiffened, such that the candle wick is operable to be positioned in a straight or virtually straight position within a candle mold for a candle making process, as well as when surrounded by the candle body and during use of the candle (e.g., burning of the candle). The candle wick maintains characteristics of capillary size, diameter, burn rate and flame height during the candle making process and thereafter as such candle wick has prior to the candle-making process. The use of the candle wick of the present invention within a candle averts the need for the exertion of tension upon the candle wick during the candle making process and tools relating thereto.

The candle wick of the present invention to which the chemical formulation is applied has properties causing the wick to retain positional memory and to have flexibility characteristics whereby the wick will return (bounce-back) to its straight or virtually straight position after force is temporarily exerted thereupon, in an almost spring-like fashion. The candle wick is stiffened yet flexible sufficiently, so that the candle wick is operable to be positioned in a straight or virtually straight position within a candle mold for a candle making process, straight when surrounded by the candle body during the entire manufacturing process.

Herein a reference to "bounce-back characteristics" references a characteristic of the candle wicks of the present invention, which functions such that the candle wicks positioned in a wick stabilizer or other support will response to temporary pressure exerted upon the wick by oscillating and then returning to its original position. In a sense the candle wicks have a positional memory, and that memory functions to cause the wick to remember its original position (prior to the pressure exerted thereupon) and to return to that position once the effects of the pressure are terminated. The effects of the pressure include a temporary bending of the candle wick in response to the pressure, and oscillation of the candle wick between positions in relation to that original position, and such positions diminishing in range gradually over time until the oscillation ceases when the wick returns to its original position or virtually its original position.

Herein a reference to "mold" can include a mold wherein a candle is formed and from which the formed candle is removed prior to use, or a container wherein a candle is formed and in which the candle remains during use.

Herein a reference to "stiff" or "stiffen" in relation to a candle wick of an embodiment of the present invention means that the wick is not rigid and is simultaneously: sufficiently stiff to maintain an upright position while supported by a candle stabilizer or other support positioned at the base of the candle wick (as described herein); and has a level of flexibility required to achieve the bounce-back characteristic (as described herein) whereby the candle wick responds to the removal of temporary pressure applied to the wick by oscillating before returning to its original position (in the manner described more fully herein).

Pursuant to the present invention, a candle comprising one or more candle wicks treated with a chemical formulation whereby each candle wick has the characteristics of a modicum of stiffness, a modicum of flexibility and bounce-back characteristics; wherein the one or more candle wicks are positioned vertically through the candle's vertical longitudinal rise.

The candle wicks are first treated with a chemical formulation whereby the candle wick has the characteristics of a level of stiffness, a level of flexibility, and bounce-back characteristics. Such process comprises treating the candle wick with a chemical formulation incorporating one or a combination of the following compounds: starch, modified starch, carboxymethyl starch, xanthan gum, carboxymethyl cellulose, acrylics, polyacrylic acid, magnesium salt and water-soluble polyester. Such process can further comprise the step of treating the candle wick by one of the following methods: coating the candle wick with the chemical formulation; or imbuing the candle wick with the chemical formulation, such as via absorption of the chemical formulation by the wick or otherwise causing the wick to incorporate the chemical formulation. In some embodiments of the present invention, the chemical formulation may be composed of the following: 0.1-20% of starch, modified starch and/or carboxymethyl starch; 0.1-20% of xanthan gum; 0.1-20% of carboxymethyl cellulose; 0.1-20% of acrylics; 0.1-20% of polyacrylic acid; 0.05-10% magnesium salt and 1-80% polyester.

The method of making a candle consists of positioning one or more candle wicks coated treated with the chemical formulation into a candle mold to be perpendicular to the mold's horizontal base and adding candle body materials to the mold whereby said candle body materials surround the one or more candle wicks and the candle body materials harden while the candle wick follows is path to remain in the perpendicular to the mold base position.

The material utilized to form the wick, and which is either coated with the chemical formulation of the present invention or that is imbued with the chemical formulation (or otherwise caused to incorporate the chemical formulation) may be of a variety of types, including nylon, paper-core, or cotton core materials used to form wicks. The chemical formulation may be coated upon or imbued into prior formed wicks, including any of the following: Aroma-Lite™ wicks (for example, such as AL-220), paper core (PK) wicks, Stabilio™ P15 (CDN) wicks (for example, such as Stabilio KST wicks), paper wicks (such as paper core wicks), Wick It™ (WI) wicks or the like.

The chemical formulation has characteristics whereby it achieves absorption into the wick materials when imbued into a wick. The chemical formulation further has characteristics whereby it can adhere to a wick when it is applied to a wick as a coating. Thus, the addition of the chemical formulation to a wick adds characteristics of stiffness (but not full rigidity) and flexibility sufficient to achieve bounce-back characteristics (as described herein) without affecting the other characteristics of the wick or the candle wherein the wick is incorporate. For example, such characteristics may include a particular burn rate or flame height. Such characteristics of a candle are important to maintain as they can affect the safety of use of the candle (e.g., by preventing fire risks caused by some flame heights or other safety risks).

The candle wicks of the present invention may be incorporated in candles that incorporate fragrance (e.g., aromatic candles) or candles that do not incorporate any fragrance.

The chemical formulation can be applied as a coating to the outer layer of a raw wick, or can be imbued or otherwise incorporated into the wick. The chemical formulation has characteristics which permit it to withstand pre-heating as well as heating caused by the addition of heated candle body materials (e.g., hot wax) to the mold during the candle making process. The characteristics of the candle wick of the present invention will be maintained when the candle wick is in proximity or connectivity to such heat, namely the modicum of stiffness of the wick and its flexibility and return to a straight position after experiencing a flex or pressure exerted thereupon (i.e., bounce-back characteristic).

In some embodiments of the present invention the chemical formulation is created to be quick-drying. In such an embodiment, a raw wick that is coated or imbued with the chemical formulation of the present invention will dry in a manner that is fast and efficient, and may have heat of a particular temperature applied thereto to assist with such drying. The application of such heat to assist with drying will not affect the stiffness, flexibility or bounce-back characteristics of the candle wick.

Once a candle wick is coated or imbued with the chemical formulation of the present invention, the wick will have a level of stiffness, but will not be fully rigid. The wick will have some give and flexibility. As an example, the wick will be able to achieve a level of flexibility if external stimulus is applied thereto or if the candle body materials exert pressure thereupon. The flexibility of the wick further includes elasticity whereby the wick will react to such stimulus or pressure by flexing, and once such stimulus or pressure is retracted the wick may vibrate within a range of flexibility which will decrease over time, and the wick will then return to the original straight or virtually straight position it was in prior to the application of the stimulus or pressure. This is the bounce-back characteristic of the candle wick once it is coated with or imbued with the chemical formulation of the present invention.

The candle wick of the present invention can be inserted into or otherwise combined with sustainers, other wick stabilizers, or other tools or equipment utilized with wicks and incorporated in candles.

In embodiments of the present invention, the chemical formulation may be applied to the candle wick in accordance with a process that includes the following steps. The chemical formulation coating is applied directly to a raw candle wick (being a candle wick that is not coated with wax or any other coating). The chemical formulation will be applied to the raw wick immediately upon the candle wick being de-spooled from the candle wick spool, and as the candle wick is inserted or fed into the wick clipping machine. In some embodiments of the present invention the process of applying the chemical formulation may be achieved by inserting the candle wick into a dip receptacle or a bath that contains the chemical formulation. In other embodiments of the present invention the process of applying the chemical formulation to the candle wick may be achieved by the candle wick passing through a series of rollers that apply the chemical formulation to the wick and that assist the formulation to penetrate the weave of the braid of the candle wick. The process of applying the chemical formulation through a process that involves rollers may further ensure a uniform or virtually uniform coating of the chemical formulation upon the candle wick.

During the process of applying the chemical formulation to the candle wick tension is applied to the candle wick. The optimum tension will be sufficient to maintain a consistent tension in the candle wick, while not creating any significant stretch in the braid of the candle wick. In some embodiments of the present invention, the tension applied to the candle wick may be between 50 g to 3,000 g. The tension that is applied will be determined in accordance with the type of candle wick (e.g., the materials that form the candle wick, and the braiding, weave or other characteristics of the candle wick formation), as well as the run speed of the process whereby the chemical formulation is applied to the candle wick. In some embodiments of the present invention the process whereby the chemical formulation is applied to the candle wick may occur within a wick clip machine, and the run time may be the run time of the wick clip machine.

In some embodiments of the present invention, after the chemical formulation is applied to the candle wick, the candle wick is exposed to a heating device. In some embodiments of the present invention, the heating device is positioned such that the heat from the heating device is applied to the candle wick immediately prior to or as the candle wick is being fed into the wick clip machine. The use of a heating device can achieve quick drying of the chemical formulation applied to the candle wick.

In embodiments of the present invention, the raw wick to which the chemical formulation is applied does not require any pre-waxing, which creates time and cost savings for the present invention.

The application of the chemical formulation to the candle wick will not diminish any of the candle burn characteristics of the candle formed to incorporate the candle wick (e.g., flame height, length of burn time, wax melt pool, etc.). For some embodiments of the present invention, the application of the chemical formulation to the candle wick will result in improved candle burn characteristics.

Referring now to FIG. 1, an example of a candle mold 10 prepared for the candle making process is shown, wherein a treated candle wick 12 (that has been treated with the chemical formulation of the present invention, either as a coating or having been n imbued with such chemical formulation) that is attached to a sustainer 16, is positioned within a candle container 14. Two additional treated candle wicks 12 attached to sustainers 16 are also positioned within the candle container.

The treated candle wick 12 is positioned in relation to a container side wall 18 and a container base 20. The sustainer 16 is flush with and in contact with the container base 20. In some embodiments of the present invention the sustainer 16 may be adhered to the container base 20, for example, by an adhesive such as a glue applied between the sustainer 16 and the container base 20. The treated candle wick 12 is further positioned to be parallel or virtually parallel to the side wall of the container. In such a position the treated candle wick 12 will be parallel or virtually parallel to the vertical and longitudinal rise of the candle.

Figure 2:
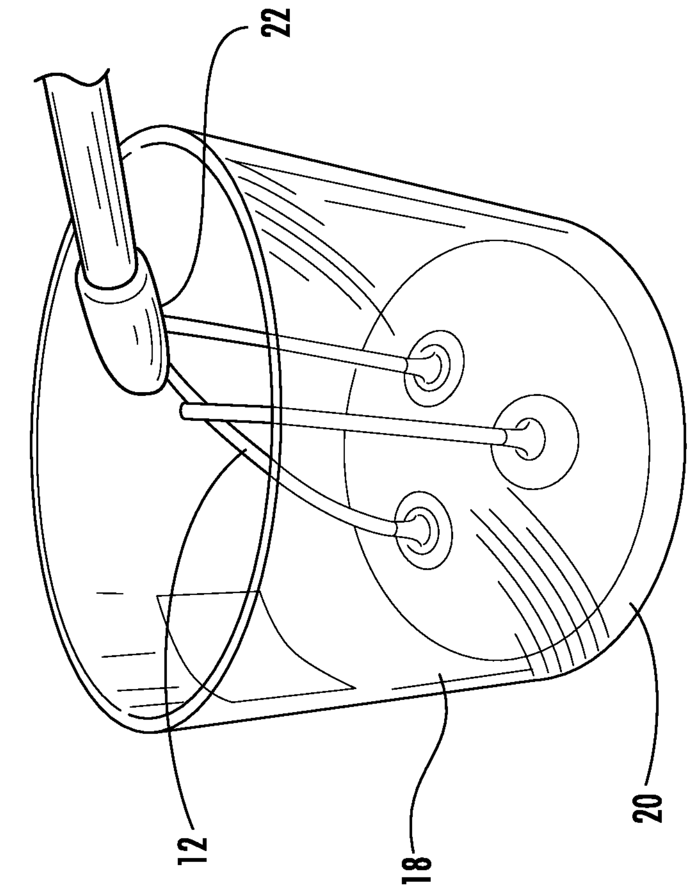
FIG. 2 is a perspective view of candle wicks of the present invention positioned within a mold during the candle making process in accordance with an embodiment of the present invention, wherein the top portion of a candle wick is moved by an exterior stimulus.

As shown in FIG. 2, when an external stimulus, such as a pen 22, exerts pressure upon the treated candle wick 12, the treated candle wick 12 will flex so as to bend in the direction of the force exerted thereupon. When the external stimulus is retracted so as to no longer exert force upon the treated candle wick 12 the treated candle wick 12 may move between two flexed positions within a range of motion 24 (as indicated by the arrow within FIG. 3). This movement may appear as a vibration of the treated candle wick 12.

Figure 4:
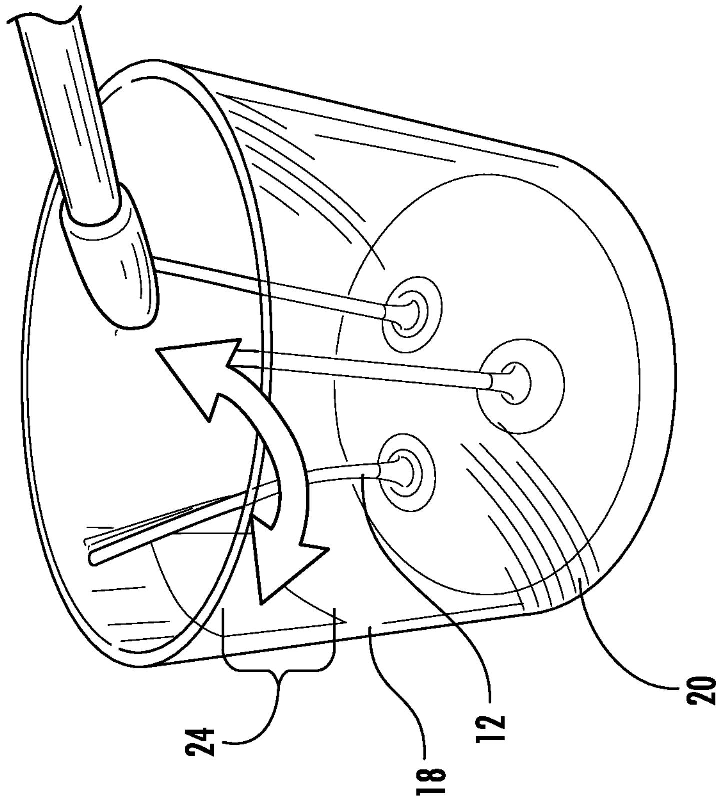
FIG. 4 is a perspective view of candle wicks of the present invention positioned within a mold during the candle making process in accordance with an embodiment of the present invention, wherein the top portion of a candle wick is vibrating between a range of motions as a result of an exterior stimulus and shows flex in such vibrations to a left position.
Figure 3:
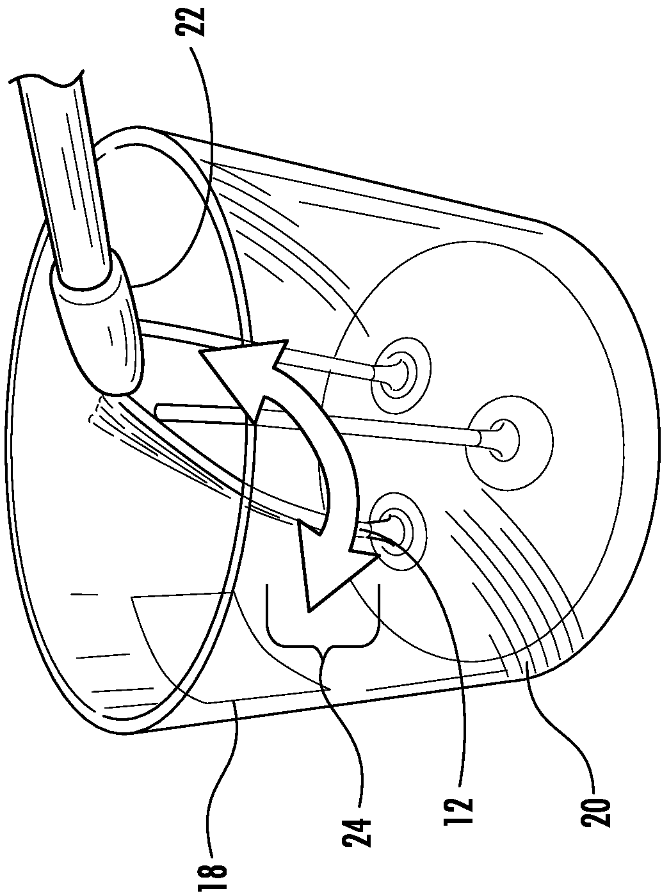
FIG. 3 is a perspective view of candle wicks of the present invention positioned within a mold during the candle making process in accordance with an embodiment of the present invention, wherein the top portion of a candle wick is vibrating between a range of motion as a result of an exterior stimulus and shows flex in such vibrations to a right position.
Figure 6:
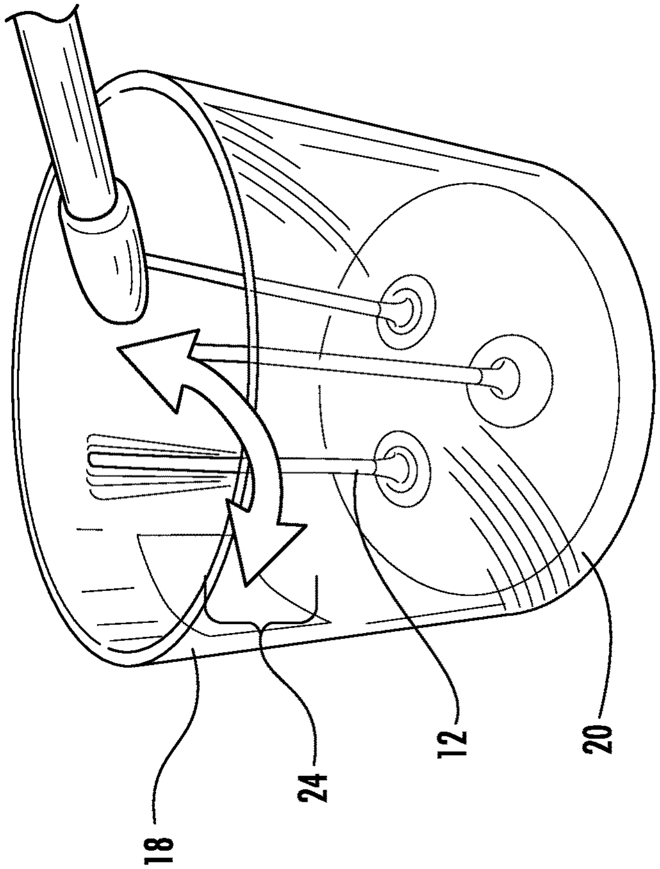
FIG. 6 is a perspective view of candle wicks of the present invention positioned within a mold during the candle making process in accordance with an embodiment of the present invention, wherein the top portion of a candle wick is vibrating between a range of motion as a result of an exterior stimulus and the range of such vibration is diminishing.
Figure 5:
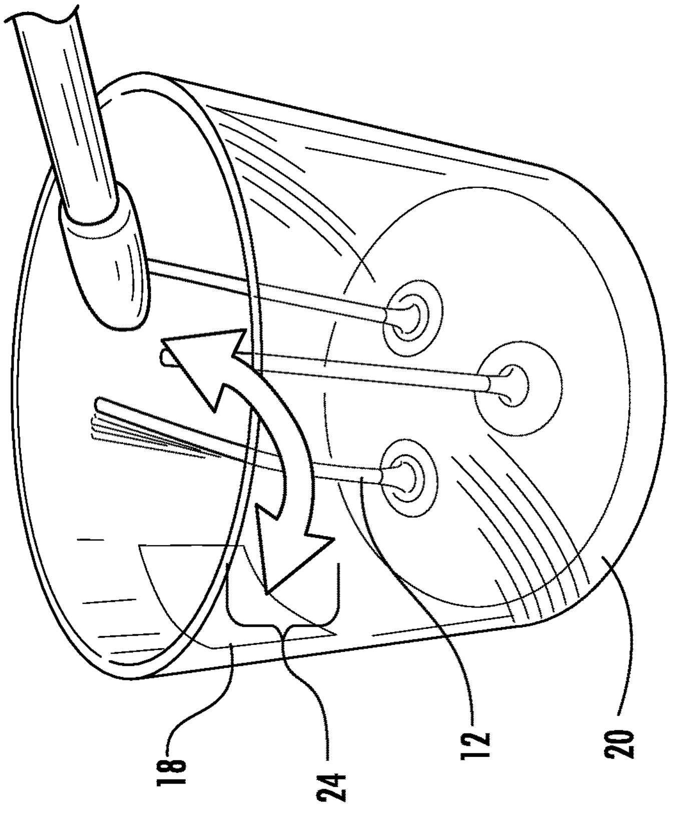
FIG. 5 is a perspective view of candle wicks of the present invention positioned within a mold during the candle making process in accordance with an embodiment of the present invention, wherein the top portion of a candle wick is vibrating between a range of motion as a result of an exterior stimulus continuing as the stimulus retracts.
Figure 8:
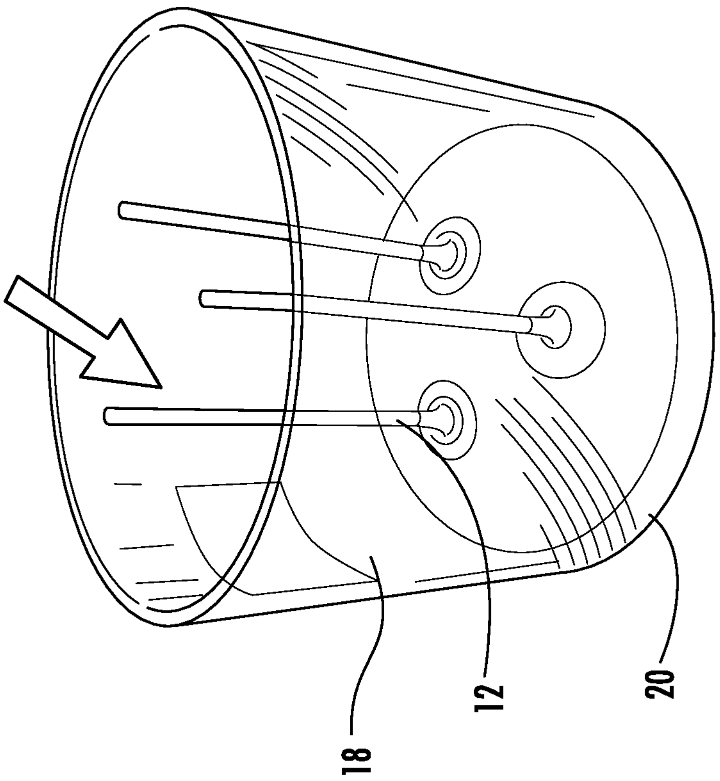
FIG. 8 is a perspective view of candle wicks of the present invention positioned within a mold during the candle making process in accordance with an embodiment of the present invention, wherein a candle wick is straight and back to its vertical position after an interaction with an exterior stimulus.
Figure 7:
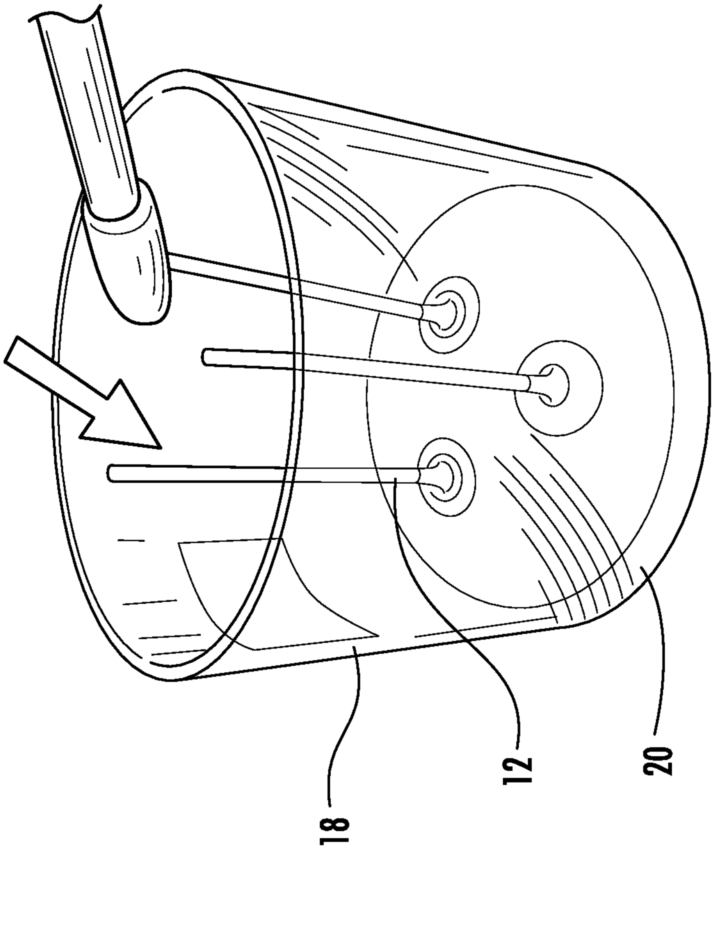
FIG. 7 is a perspective view of candle wicks of the present invention positioned within a mold during the candle making process in accordance with an embodiment of the present invention, wherein a candle wick is virtually straight and back to its vertical position after an interaction with an exterior stimulus.

The range of motion 24 may move between positions that cause the treated candle wick 12 to flex in an alternating pattern in two opposite directions, e.g., to the right (as shown in FIG. 3) and to the left (as shown in FIG. 4) of the centered straight or virtually straight position of the treated candle wick 12 when it was originally stationary and at rest prior to the force being exerted thereupon (the centered position). As shown in FIGS. 6 and 7, the range of motion 24 may decrease in range, whereby the flex of the treated candle wick 12 in the alternating opposite directions from the centered position of the treated candle wick 12 gradually lessens. The speed at which the treated candle wick 12 moves within the range of motion 24 will also decrease with time until it becomes imperceptible, as shown in FIG. 7. When such movement of the treated candle wick 12 ceases as shown in FIG. 8, the treated candle wick 12 will return to the straight or virtually straight, centered position being its original position at when it was at rest prior to the stimulus being exerted thereupon. The drawings therefore show the bounce-back characteristics of the treated candle wick 12, and how such characteristics are affected so that the treated candle wick 12 returns to its original centered position, in the manner similar to how a spring held vertically will return to it is original vertical position after force exerted thereupon is retracted, after a period of vibrating within a range of motion 24.

The amount of time which elapses between the stimulus being exerted upon the treated candle wick 12 and it returning to its original centered position will depend upon the level of pressure exerted by such stimulus.

When the candle body materials are added to the mold such materials will surround the treated candle wick 12, and the treated candle wick 12 will maintain a straight or virtually straight position within the candle in relation to the vertical center of such candle.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements, possesses those one or more steps or elements, but is not limited to possessing only those one or more elements. Likewise, a step of a method or an element of a device that "comprises," "has," "includes," or "contains" one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A process of manufacturing a candle including the step of treating a candle wick with a chemical formulation incorporating a combination of the following compounds to form a bounce back behavior: 0.1-20% by weight of starch, modified starch and/or carboxymethyl starch; 0.1-20% by weight of xanthan gum; 0.1-20% by weight of carboxymethyl cellulose; 0.1-20% by weight of acrylics; 0.1-20% by weight of polyacrylic acid; 0.05-10% by weight of magnesium salt and 1-80% by weight of polyester in the formulation, attaching a first end of a wick to the bottom surface causing a second end of said wick to be perpendicular to the bottom surface of a mold; adding candle body materials to the mold around said wick; whereby said candle body materials surround the wick wherein said wick maintains the perpendicular configuration.

2. The process of claim 1 further comprising treating each said candle wick by coating the candle wick with the chemical formulation or imbuing the candle wick with the chemical formulation.

3. The process of claim 1 wherein said chemical formulation is applied to said candle wick immediately upon said candle wick being de-spooled from a candle wick spool, and as said candle wick is inserted into a wick clipping machine.

4. The process of claim 1 wherein application of said chemical formulation to said candle wick is achieved by inserting said candle wick into a dip receptacle that contains said chemical formulation.

5. The process of claim 1 wherein application of said chemical formulation to said candle wick may be achieved by said candle wick passing through a series of rollers that apply said chemical formulation to said candle wick and assist said chemical formulation to penetrate a candle wick braid.

6. The process of claim 1 further comprising the step of heating a wick after the chemical formulation is applied to achieve quick drying of said wick.

* * * * *